`US010926715B1`

(12) United States Patent
Soler et al.

(10) Patent No.: US 10,926,715 B1
(45) Date of Patent: Feb. 23, 2021

(54) VEHICLE CAMERA SYSTEM

(71) Applicants: Vidal M. Soler, Miami, FL (US);
Nersa Soler, Miami, FL (US); Myrna Trenchard, Miami, FL (US)

(72) Inventors: Vidal M. Soler, Miami, FL (US);
Nersa Soler, Miami, FL (US); Myrna Trenchard, Miami, FL (US)

( * ) Notice: Subject to any disclaimer, the term of this patent is extended or adjusted under 35 U.S.C. 154(b) by 0 days.

(21) Appl. No.: 16/440,685

(22) Filed: Jun. 13, 2019

(51) Int. Cl.
| B60R 11/04 | (2006.01) |
| B60K 35/00 | (2006.01) |
| B60R 1/00  | (2006.01) |
| G08G 1/16  | (2006.01) |
| H04N 5/232 | (2006.01) |

(52) U.S. Cl.
CPC .............. B60R 11/04 (2013.01); B60K 35/00 (2013.01); B60R 1/00 (2013.01); G08G 1/166 (2013.01); G08G 1/167 (2013.01); H04N 5/23203 (2013.01); B60K 2370/152 (2019.05); B60R 2300/105 (2013.01); B60R 2300/802 (2013.01); B60R 2300/8066 (2013.01)

(58) Field of Classification Search
None
See application file for complete search history.

(56) References Cited

U.S. PATENT DOCUMENTS

| 5,530,421 | A | * | 6/1996 | Marshall | .................... | B60R 1/00 |
| | | | | | | 340/435 |
| 5,574,443 | A | * | 11/1996 | Hsieh | ........................ | B60R 1/00 |
| | | | | | | 340/435 |
| 6,549,130 | B1 | * | 4/2003 | Joao | ...................... | B60R 25/018 |
| | | | | | | 340/539.14 |
| 8,934,011 | B1 | * | 1/2015 | Soler | ...................... | B60R 25/305 |
| | | | | | | 348/143 |
| 2001/0056544 | A1 | * | 12/2001 | Walker | .................... | B60R 25/02 |
| | | | | | | 726/2 |
| 2008/0204556 | A1 | * | 8/2008 | de Miranda | .......... | B60R 25/102 |
| | | | | | | 348/148 |
| 2010/0097199 | A1 | * | 4/2010 | Schwartz | .................. | B60R 1/00 |
| | | | | | | 340/435 |
| 2010/0201816 | A1 | * | 8/2010 | Lee | ........................... | B60R 1/12 |
| | | | | | | 348/148 |

(Continued)

OTHER PUBLICATIONS

Search Report IP.com.*

*Primary Examiner* — Mohammad J Rahman
(74) *Attorney, Agent, or Firm* — John Rizvi; John Rizvi, P.A.—The Patent Professor®

(57) ABSTRACT

A real time vehicle camera system is provided that can video image, record and display an area around a vehicle in response to activation of turn signals or backup lights to assist in preventing accidents with other vehicles or pedestrians. The vehicle camera system includes an array of video cameras positioned at various locations around the vehicle and a video input/output system that receives and records video images generated by the array of video cameras and displays them on a monitor for observation by a driver of the vehicle or at a remote location. The vehicle camera system also includes a control system which supplies power and a timed activation signal to the array of cameras and the video input/output system. The control system may additionally include a wireless communications terminal and a remote disabling device connected to the wireless communications terminal.

18 Claims, 4 Drawing Sheets

(56) References Cited

U.S. PATENT DOCUMENTS

| | | | |
|---|---|---|---|
| 2010/0225738 A1* | 9/2010 | Webster | B60R 11/04 348/36 |
| 2012/0154591 A1* | 6/2012 | Baur | B60R 1/00 348/148 |
| 2013/0093889 A1* | 4/2013 | Headley | B60R 1/00 348/148 |
| 2014/0229068 A1* | 8/2014 | Ueyama | B62D 15/0255 701/41 |
| 2014/0309855 A1* | 10/2014 | Tran | B60Q 1/38 701/36 |
| 2015/0242855 A1* | 8/2015 | Vilnai | B67D 7/34 705/44 |
| 2015/0258961 A1* | 9/2015 | Doherty | B60R 25/33 701/2 |
| 2017/0108873 A1* | 4/2017 | Tanaka | B60W 50/14 |
| 2018/0072228 A1* | 3/2018 | Mano | H04N 7/181 |
| 2018/0176533 A1* | 6/2018 | Friebe | G06T 15/10 |
| 2018/0229656 A1* | 8/2018 | Yokota | G08G 1/166 |
| 2018/0272943 A1* | 9/2018 | Dudar | B60R 1/1207 |
| 2018/0297525 A1* | 10/2018 | Raybuck, III | G06F 3/14 |
| 2019/0100142 A1* | 4/2019 | Lynam | B60R 1/00 |
| 2019/0199940 A1* | 6/2019 | Shidochi | H04N 7/181 |
| 2019/0302789 A1* | 10/2019 | Miura | G06K 9/2054 |
| 2020/0209850 A1* | 7/2020 | Abu Elreich | G05D 1/0061 |

* cited by examiner

VEHICLE CAMERA SYSTEM

FIELD OF THE INVENTION

The present invention relates generally to motor vehicle safety devices and systems, and more particularly, to a vehicle camera system that provides a driver with a video image of the side and rear of the vehicle while turning.

BACKGROUND OF THE INVENTION

It is important when operating a motor vehicle to be able to see all around the vehicle in order to avoid accidents with objects or other motor vehicles and especially pedestrians. This is particularly true when making turns, as various areas around the vehicle are obscured from vision by structures of the vehicle, for example "A" arms between the vehicle's body and roof, as well as limitations in the coverage provided by the vehicle's mirrors.

Backup cameras have been installed by vehicle manufacturers in some vehicles. However, while backup cameras provide a video image directly to the rear, they are of little or no assistance in viewing alongside the vehicle in the blind spots while turning.

Additionally, accidents between motor vehicles happen and incidents involving motor vehicles and pedestrians or stationary objects also happen. How these accidents or incidents occurred is often left up to the memories of the parties involved and any witnesses. Surveillance video cameras in nearby stores or on municipal poles may help, but they are not always available. A further disadvantage or limitation of vehicle backup cameras is that they provide no video image of events happening in front of the vehicle in case of an accident or incident.

Further, theft or damage to the vehicle can occur in the owner's or driver's absence. Witnesses may not be present or their memories fail and local store or municipal surveillance cameras may not be available.

Accordingly, there is an established need for a vehicle camera system that can display real time video images of events occurring around a vehicle's perimeter. For example, there is a need for a vehicle camera system which helps a vehicle driver carry out safe turns and other operations of the motor vehicle. Alternatively or additionally, a vehicle camera system that can record the video images around the vehicle to preserve evidence of what happens about the vehicle during an accident, incident or theft is desired.

SUMMARY OF THE INVENTION

The present invention is directed to a real time vehicle camera system that can video image, record and display an area around a vehicle in response to activation of turn signals or backup lights to assist in preventing accidents with other vehicles or pedestrians. The vehicle camera system includes an array of video cameras positioned at various locations around the vehicle and a video input/output system that receives and records video images generated by the array of video cameras and displays them on a monitor for observation by a driver of the vehicle or at a remote location. The vehicle camera system also includes a control system which supplies power and a timed activation signal to the video input/output system. The control system may additionally include a wireless communications terminal and a remote disabling device connected to the wireless communications terminal.

In a first implementation of the invention, a video camera system for capturing and processing images around a vehicle includes a camera array having a rear left video camera configured to capture a first video image showing an area at the left and rear of a vehicle, a rear right video camera configured to capture a second video image showing an area at the right and rear of a vehicle, and a rear video camera configured to capture a third video image showing an area at the rear of a vehicle. The video camera system further includes a video input and output system for receiving the video images generated by the camera array. The video input and output system is connected to the camera array and is configured to provide a selective video signal containing: responsively to activation of a left turn signal of the vehicle, a combination of the first and third video images; or responsively to activation of a right turn signal of the vehicle, a combination of the second and third video images.

In a second aspect, the selective video signal provided by the video input and output system can include, responsively to user operation of the vehicle brakes, a combination of the first, second and third video images.

In another aspect, the camera array can further include a reverse video camera configured to capture a fourth video image showing an area at the rear of the vehicle. The selective video signal provided by the video input and output system can include, responsively to switching of the vehicle to reverse, the fourth video image and, optionally, not include the first, second and third video images.

In another aspect, the area at the left and rear of the vehicle can overlap with the area at the rear of the vehicle. Alternatively or additionally, the area at the right and rear of the vehicle can overlap with the area at the rear of the vehicle.

In another aspect, the video camera system can further include a digital video recorder configured to record the first, second and third video images.

In another aspect, the video camera system can further include a monitor configured to view the selective video image and/or the first, second and third video images.

In another aspect, the camera array can further include at least one frontward-oriented camera configured to capture at least one front video image of a front of the vehicle. The monitor can also be configured to display the at least one front video image. Alternatively or additionally, the digital video recorder can also be configured to record the at least one front video image.

In another aspect, the at least one frontward-oriented camera may include a front left video camera configured to capture a fifth video image showing an area at the left and front of a vehicle, a front right video camera configured to capture a sixth video image showing an area at the right and front of a vehicle, and a front video camera configured to capture a seventh video image showing an area at the front of a vehicle.

In another aspect, the area at the left and front of the vehicle can overlap with the area at the front of the vehicle. Alternatively or additionally, the area at the right and front of the vehicle can overlap with the area at the front of the vehicle.

In another aspect, the vehicle camera system may be configured to be powered on by at least one of a vehicle ignition activation signal responsive to vehicle ignition activation, a vehicle alarm activation signal responsive to a vehicle alarm activation, and a remote command activation signal generated by a computer network terminal comprised in the video camera system. The remote command activation signal may be generated responsively to the computer network terminal receiving an activation command from a remote terminal over a computer network.

In another aspect, the video camera system can further include a remote disabling module and a computer network terminal. The remote disabling module can include a normally-powered output configured to be unpowered responsively to the computer network terminal receiving a deactivation command from a remote terminal over a computer network. In some embodiments, the normally-powered output may be electrically connected to and configured to power a vehicle fuel pump.

Introducing another implementation of the invention, the present invention consists of a video camera system for imaging around a perimeter of a vehicle, comprising:

a camera array including a rear left video camera, a rear right video camera and a rear video camera for generating video images of an area around a rear and sides of a vehicle; and a video input and output system for receiving the video images generated by the camera array, the video input and output system being connected to the camera array and including a digital video recorder for recording the video images, a monitor for viewing the video images and first and second multiplexers for combining images generated by the camera array to create first and second sets of images for display on the monitor.

In a second aspect, the video camera system can further include a control system including a control and power supply module connected to the video input and output system such that the control system supplies a timed activation signal to the video input and output system in response to activation inputs.

In another aspect, the video input and output system includes a video switch connected to the video input and output system such that the video switch selectively sends the sets of the video images to the monitor in response to inputs received.

In another aspect, the video input and output system includes a third multiplexer for combining images received from the camera array into a third set of images for display on the monitor.

In another aspect, the video input and output system includes a wireless modem connected to the digital video recorder to remotely receive the recorded video images.

In another aspect, the control system includes a cellular terminal connected to the control and power supply system for remotely controlling the control and power supply module.

In another aspect, the control system further includes a remote vehicle disabling device connected to the cellular terminal for remotely disabling the vehicle.

In another aspect, the camera array also includes a front right camera, a front rear camera and a front camera.

In another aspect, the camera array also includes a backup camera.

In another aspect, the backup camera has a wider area of coverage than the rear camera.

In another aspect, the rear right video camera and the rear camera are activated in response to activation of a right turn signal of the vehicle.

In another aspect, the rear left video camera and the rear camera are activated in response to activation of a left turn signal of the vehicle.

In another aspect, the rear camera is a default camera sending video images to the video switch in the absence of any alternative inputs.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a real time vehicle camera system that can capture and display video images of an area around a vehicle in response to activation of turn signals or backup lights, to assist in preventing accidents with other vehicles or pedestrians. The vehicle camera system includes an array of cameras positioned at various locations around the vehicle and a video input/output system that receives the images and displays them on a monitor for observation by a driver of the vehicle. The vehicle camera system also includes a control system which supplies power and a timed activation signal to the array of cameras and the video input/output system. The control system may additionally include a wireless communications terminal and a remote disabling device connected to the wireless communications terminal.

Figure 1:
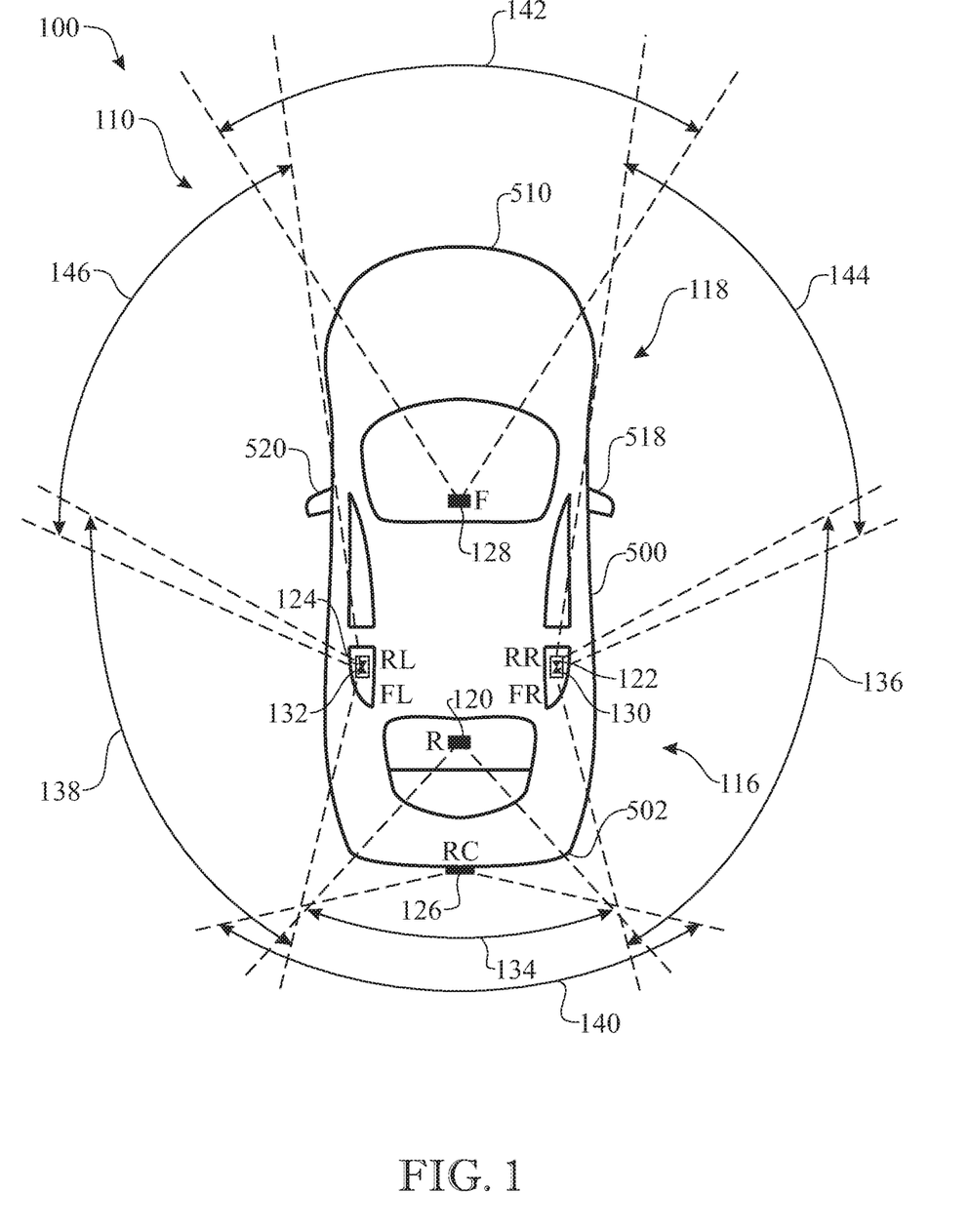
FIG. 1 presents a schematic top view of a vehicle camera system in accordance with an illustrative embodiment of the present invention, showing multiple video cameras of the video camera system positioned at various locations about a vehicle.
Figure 2:
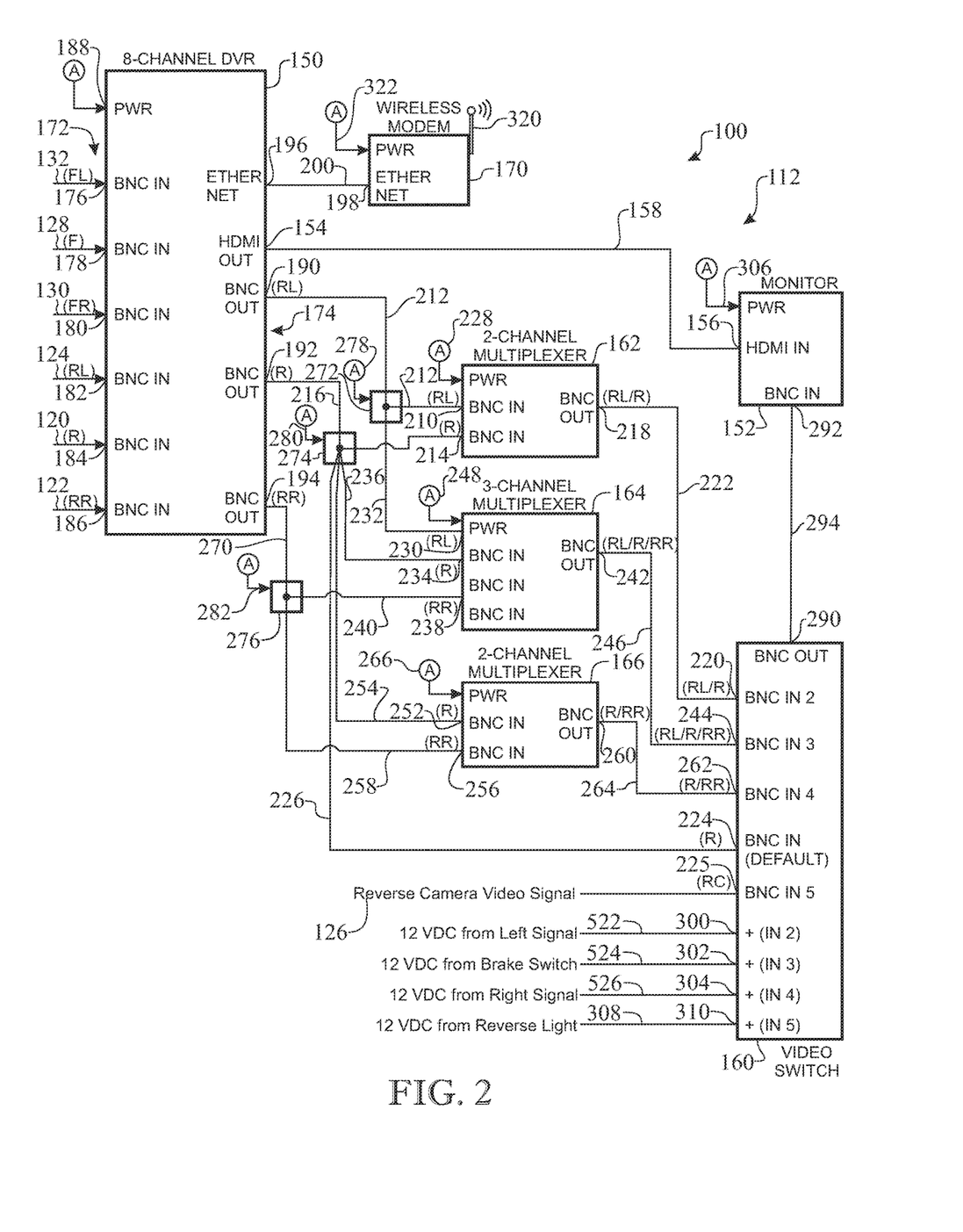
FIG. 2 presents an electrical diagram of part of the vehicle camera system of FIG. 1, said part comprising a digital video recorder, a video switch and a monitor.
Figure 3:
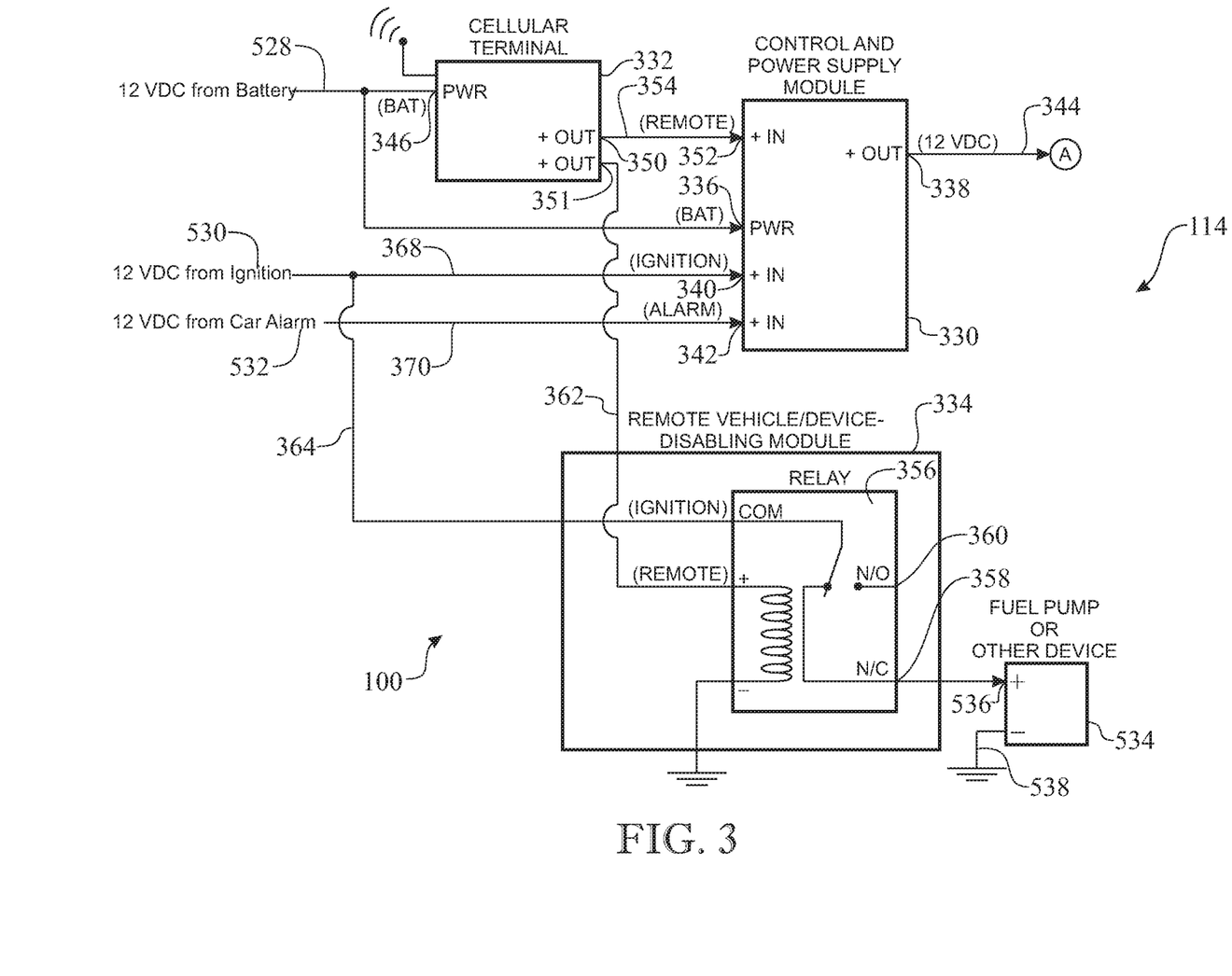
FIG. 3 presents an electrical diagram of another part of the vehicle system of FIG. 1, said another part comprising a cellular terminal, a control module and a remote vehicle-disabling device.

Referring to FIGS. 1-3, and initially to FIG. 1, a vehicle camera system 100 is depicted in accordance with an exemplary embodiment of the present invention, configured as a multi-camera array and operating system. As shown, the vehicle camera system 100 generally includes a camera array 110 located on a vehicle 500, a video input/output system 112 (FIG. 2) for receiving and processing the images generated by the camera array 110 and a control system (FIG. 3) for powering and activating the camera array 110 and the video input/output system 112. The vehicle 500 may be a personal use motor vehicle or a commercial motor vehicle typically having blind spots at various locations around the vehicle, particularly towards the rear 502 of the vehicle 500, which block or obscure the visibility of objects or persons positioned there from a driver.

In order to allow the driver of the vehicle 500 to see around the blind spots, particularly while turning, the camera array 110 of the vehicle camera system 100 includes a rearward-facing or first array of cameras 116 which provide real time video images of an area around the rear 502 of the vehicle 500. The first array of cameras 116 can include a rear camera (R) 120 positioned at or near the rear 502 of the vehicle 500, a rear right camera (RR) 122 positioned at a right-hand side of the vehicle 500 and a rear left camera (RL) 124 positioned at a left-hand side of the vehicle 500. As will be described in more detail hereinafter, images from the rear right camera 122 are viewed when the driver operates the turn signal lever to signal a right turn signal or operates the vehicle brakes; images from the rear left camera 124 are viewed when the driver operates the turn signal lever to signal a left turn or operates the brakes; and images from the rear camera 120 are viewed when the driver operates the brakes or operates the turn signal lever to signal either a left turn or a right turn. The first array of cameras 116 may additionally include a reverse camera (RC) 126 which is activated when the driver puts the car into reverse. In some embodiments, such as the present embodiment, the reverse camera (RC) 126 may have a wider view angle than the rear camera (R) 120.

The camera array 110 may additionally include a forward-facing or second array of cameras 118 positioned at the front 510 of the vehicle 500 to allow a driver to view obscured objects or persons at the front 510 of the vehicle 500 as well as record video footage or images of any incidents or accidents as they occur. The second array of cameras 118 can include a front camera (F) 128 positioned for instance at or near a front 510 of the vehicle 500, a front right camera (FR) 130 and a front left camera (FL) 132. In some embodiments of the vehicle camera system 100, as shown, the front right (FR) camera 130 may be positioned on the right-hand side of the vehicle 500 while the front left (FL) camera 132 may be positioned on the left-hand side of the vehicle 500; in other embodiments, the front right (FR) camera 130 may be positioned on a right mirror 518 of the vehicle 500 while the front left (FL) camera 132 may be positioned on a left mirror 520 of the vehicle 500. In some embodiments, the forward-facing or second array of cameras 118 may be activated or operable the entire time the vehicle camera system 100 is activated to better view and record any forward-facing incidents while the vehicle is driving or parked.

The rearward-facing or first array of cameras 116 provides a broad spectrum of visual coverage for use by the driver. For example, the rear camera (R) 120 can provide a first angle or area of video coverage 134 directly towards the rear 502 of the vehicle 500, or rearward, while the rear right camera (RR) 122 and the rear left camera (RL) 124 can provide second and third angles or areas of video coverage 136 and 138, respectively, towards the right and rear, and left and rear of the vehicle 500, respectively. As shown, the reverse camera (RC) 126 provides a fourth angle or area of video coverage 140 directly to the rear 502 of the vehicle 500, or rearward, similar to the first area of video coverage 134. In this embodiment, the fourth angle or area of video coverage 140 generated by the reverse camera (RC) 126 is wider or greater than the first angle or area of video coverage 134 generated by the rear camera 120 to allow a broader field of view while backing the vehicle 500 up. In some embodiments, as shown, the view angles or third and first areas of video coverage 138 and 134 of the rear left camera (RL) 124 and rear camera (R) 120, respectively can overlap to prevent blind spots therebetween. In turn, the view angles or first and second areas of video coverage 134 and 136 of the rear camera (R) 120 and rear right camera (RR) 122, respectively, can overlap to prevent blind spots therebetween.

Similarly, the forward-facing or second array of cameras 118 provides a broad spectrum of visual and video coverage for use by the driver and a recording device associated with the vehicle camera system 100 as described below. The front camera (F) 128 provides a fifth angle or area of video coverage 142 while the front right camera (FR) 130 and the front left (FL) camera 132 provide sixth and seventh angles or areas of video coverage 144 and 146, respectively. In some embodiments, as shown, the view angles or third and first areas of video coverage 146 and 142 of the front left camera (FL) 132 and front camera (F) 128, respectively can overlap to prevent blind spots therebetween. In turn, the view angles or first and second areas of video coverage 142 and 144 of the front camera (F) 128 and front right camera (FR) 130, respectively, can overlap to prevent blind spots therebetween. To further prevent blind spots, as shown, the view angles or third and seventh areas of video coverage 138 and 146 of the rear left camera (RL) 124 and front left camera (FL) 132, respectively, can overlap. Similarly, the view angles or second and sixth areas of video coverage 136 and 144 of the rear right camera (RR) 122 and front right camera (FR) 130, respectively, can overlap.

Turning now to FIG. 2, the video images generated by the first and second array of cameras 116 and 118, respectively, are transmitted to the video input/output system 112 of the vehicle camera system 100 for recording and storage on a digital video recorder 150 and display to the driver on a screen or monitor 152 installed in the vehicle 500. By recording and storing all video images generated by the first and second arrays of cameras 116 and 118, video evidence is preserved in the event of an accident or other incident. All the video images generated by the first and second array of cameras 116 and 118 may be simultaneously transmitted directly from the digital video recorder 150 to the monitor 152 and displayed there, for instance in tiled format with each camera image being displayed separately on a segment of the monitor 152. Recording and displaying of simultaneously all video images of the first and second arrays of cameras 116 and 118 on the monitor 152 provides the driver or an owner of the vehicle 500 the ability to simultaneously see and record video images spanning all around the vehicle 500. In some embodiments, the digital video recorder 150 can include a high-definition multimedia interface or HDMI output 154 and the monitor 152 can include a HDMI input 156. In this mode of operation, all the video signals of both the first and second camera arrays 116 and 118, respectively, are transmitted from the HDMI output 154 of the digital video recorder 150 directly to the HDMI input 156 of the monitor 152 through a connection or line 158. In alternative embodiments of the invention, ports and video protocols other than HDMI may be available at an output of the digital video reorder 150 and/or at an input of the monitor 152, and converters/adapters may appropriately be used if needed to connect different-type ports to one another.

Additionally, the video input/output system 112 of the vehicle camera system 100 can split and/or combine images from the first array of cameras 116 into sets of images for display in a tiled format on the monitor 152. The video input/output system 112 includes a video switch 160 for receipt of specific combinations or sets of video images and transmitting those combinations of images to the monitor 152 in response to activation inputs from a variety of sources such as, for example, operation of a right turn signal and/or a left turn signal of the motor vehicle 500 as discussed below. In order to generate these combined video images, the video images coming from the digital video recorder 150 are processed through one or more multiplexers which receive the individual video images generated by the rear camera (R) 120, the rear right camera (RR) 122 and the rear left camera (RL) 124 and process them into specific combinations of images for transmission to the monitor 152 by the video switch 160. The video input/output system 112 includes a first multiplexer 162, a second multiplexer 164 and a third multiplexer 166 for processing and combining the various video images as will be described in greater detail hereinafter.

Additionally, the video images generated by the rear camera (R) 120 and the reverse camera (RC) 126 may be received directly by the video switch 160 for selective transmission to the monitor 152 for display to the driver. For example, when the driver activates the brakes of the vehicle 500 the images generated by the rear camera (R) 120 can be transmitted to the monitor and when the driver puts the vehicle 500 in reverse the images generated by the reverse camera (RC) 126 can be transmitted to the monitor 152. Selective transmission of different video images or combinations thereof by the video switch 160 will be described in greater detail hereinafter.

Finally, the video input/output system 112 may additionally include a wireless modem 170 for wirelessly transmitting the video images generated by the first and second arrays of cameras 116 and 118, respectively, to a remote device or system (not shown) that may record, view and/or process the video images as needed. For example, the video images may be transmitted to a user or owner's cell phone, home computer, security monitoring service, etc. over a computer network such as, but not limited to, the Internet. For this purpose, the wireless modem 170 may include one or more internal or external antennas 320 for transmitting all the video images captured by the first and second camera arrays 116 and 118 to the remote device or system.

As further shown in FIG. 2, the digital video recorder 150 includes a plurality of input connections 172 for receipt of images from the first and second arrays of cameras 116 and 118 and a plurality of output connections 174 for transmitting images generated by the first array of cameras 116 to one or more of the multiplexers. The plurality of input connections 172 include a first input connection 176 receiving video images from the front left camera (FL) 132, a second input connection 178 receiving video images from the front camera (F) 128 and a third input connection 180 for receiving video images from the front right camera (FR) 130. The plurality of input connections 172 additionally includes a fourth input connection 182 for receiving video images from the rear left camera (RL) 124, a fifth input connection 184 for receiving video images from the rear camera (R) 120 and a sixth input connection 186 for receiving video images from the rear right camera (RR) 122. In some embodiments, the first through sixth input connections 176-186 may be bayonet Neill-Councelman or "BNC" type connectors to facilitate installation; however, alternative video connectors and wiring formats are contemplated. The digital video recorder 150 additionally includes a further input or power/activation connection 188 for the input of a positive or power signal for activating the digital video recorder 150. In some embodiments, the power/activation connection 188 can receive an operating power or activation signal "A" from the control system 114.

The plurality of output connections 174 generally includes a first output connection 190 for transmitting video images from the rear left camera (RL) 124, a second output connection 192 for transmitting video images from the rear camera (R) 120 and a third output connector 194 for transmitting video images from the rear right camera (RR) 122 to one or more of the aforementioned multiplexers. In some embodiments, the plurality of output connections 174 can be of the BNC type or other known video format. As will be described in greater detail hereinafter, the driver can operate the monitor 152 to switch between the various inputs, i.e., between the HDMI input 156 showing all six cameras R, RL, RR, F, FL, FR in tiled format and the applicable BNC video signal or video signal combination which is automatically selected by the video switch 160.

In addition to the HDMI output 154, the digital video recorder 150 includes a further output connector or modem output connection 196 for transmitting any or all of the video images to the wireless modem 170. The wireless modem 170 includes a corresponding modem input connection 198 for receiving the video images through a wired connection or line 200 connected to both the input and output connections 196 and 198, respectively. In some embodiments, the modem output and/or modem input connections 196 and 198 may be of the Ethernet type connections. Alternatively to having modem output and input connections 196 and 198 connected via a wire or line 200, embodiments of the invention are contemplated in which the digital video recorder 160 and wireless modem 170 can be wirelessly communicated with one another.

The first multiplexer 162 is a 2-channel multiplexer including a first input connection 210 for receipt of video images of the rear left camera (RL) 124 received from the first output connection 190 of the digital video recorder 150 along a connection or line 212 and a second input connection 214 for receiving video images of the rear camera (R) 120 received from the second output connection 192 of the digital video recorder 150 along a connection or line 216. The first multiplexer 162 combines the images generated by the rear left camera (RL) 124 and the rear camera (R) 120 and transmits the combined RL/R image to the video switch 160. Specifically, the first multiplexer 162 includes a first output connection 218 which is connected to a second input connection 220 of the video switch 160 through a line or connection 222. In some embodiments, these input and output connections can also be of the BNC type. From this point forward, unless otherwise noted, all connections in the video input/output system 112 are of the BNC type in the embodiment depicted herein. Finally, the first multiplexer 162 additionally include a power or activation connection 228 for receiving the operating power or activation signal "A" from the control system 114.

The second multiplexer 164 is a 3-channel multiplexer including a first input connection 230 for receipt of video images of the rear left camera (RL) 124 received from the first output connection 190 of the digital video recorder 150 along a connection or line 232 and a second input connection 234 for receipt of video images of the rear camera (R) 120 received from the second output connection 192 of the digital video recorder 150 along a connection or line 236. The second multiplexer 164 additionally includes a third input connection 238 for receipt of video images of the rear right camera (RR) 122 received from the third output connection 194 of the digital video recorder 150 along a connection or line 240. Thus, the second multiplexer 164 transmits a combined set of images from the rear, rear right and rear left cameras (R/RR/RL) 120, 122 and 124 respectively, to the video switch 160. Specifically, the second multiplexer 164 includes an output connection 242 which is connected to a third input connection 244 of the video switch 160 through a connection or line 246 allowing all three camera images to be displayed simultaneously on the monitor 152, such as in tiled format. Finally, the second multiplexer 164 additionally includes a power or activation connection 248 for receiving the operating power or activation signal "A" from the control system 114.

The third multiplexer 166 is a 2-channel multiplexer including a first input connection 252 for receipt of video images of the rear camera (R) 120 from the second output connection 192 of the digital video recorder 150 along a connection or line 254 and a second input connection 256 for receipt of video images of the rear right camera (RL) 122 from the third output connection 194 of the digital video recorder 150 along a connection or line 258. The third multiplexer 166 includes an output connection 260 which is connected to a fourth input connection 262 of the video switch 160 through a connection or line 264. Thus, the third multiplexer 166 transmits a combines set of images from the rear camera (R) 120 and right rear camera (RR) 122 to the video switch 160 allowing the two sets of video images to be displayed on the monitor 152, such as in tiled format. The third multiplexer 166 additionally includes a power or activation connection 266 for receiving the operating power or activation signal "A" from the control system 114.

Regarding the type of multiplexing provided by the first, second and third multiplexers 162, 164 and 166, in some embodiments, the combined image generated by any one of said multiplexers can consist in a tiled combination of the input images fed to the multiplexer; alternatively, the multiplexing carried out by any one of said multiplexers can consist in a time-division multiplexing by which the input images fed to the multiplexer are alternated throughout time.

In order to convey the various sets of images from the digital video recorder 150 to the first, second and third multiplexers 162, 164 and 166, respectively, the video input/output system 112 includes a 1-to-2-channel or first splitter 272 which is connected to the connection or line 212 carrying the video image from the rear left camera (RL) 124 provided at the first output connection 190 of the digital video recorder 150 and splits the connection or line 212 into two connections or lines 212 and 232 extending to the first and second multiplexers 162 and 164, respectively. The video input/output system 212 includes a 1-to-4-channel or second splitter 274 which receives the connection or line 216 carrying the video image from the rear camera (R) 120 from the second output connection 192 of the digital video recorder 150 and splits the connection or line 216 into the four connections or lines 216, 236 and 254 extending to the first, second and third multiplexers 162, 164 and 166, respectively, as well as extending the connection or line 216 to connection or line 226 extending to the default input 224 of the video switch 160. Finally, the video input/output system 112 also includes a 1-to-2-channel or third splitter 276 which receives the connection or line 270 carrying the video image from the rear right camera (RR) 122 from the third output connection 194 of the digital video recorder 150 and splits the connection or line 270 into connections or lines 240 and 264 extending to the second and third multiplexers 164 and 166, respectively. The first, second and third splitters 272, 274 and 276 include respective power or activation connections 278, 280 and 282 for receiving the operating power or activation signal "A" from the control system 114.

Finally, as can be further seen in FIG. 2, the second output connection 192 of the digital video recorder 150, carrying the video image from the rear camera (R) 120, is not only fed to the multiplexers but also connected to a first or default input connection 224 of the video switch 160 through a connection or line 266. In addition, the reverse camera (RC) 126 is connected directly to the video switch 160 through a fifth input connection 225.

Figure 4:
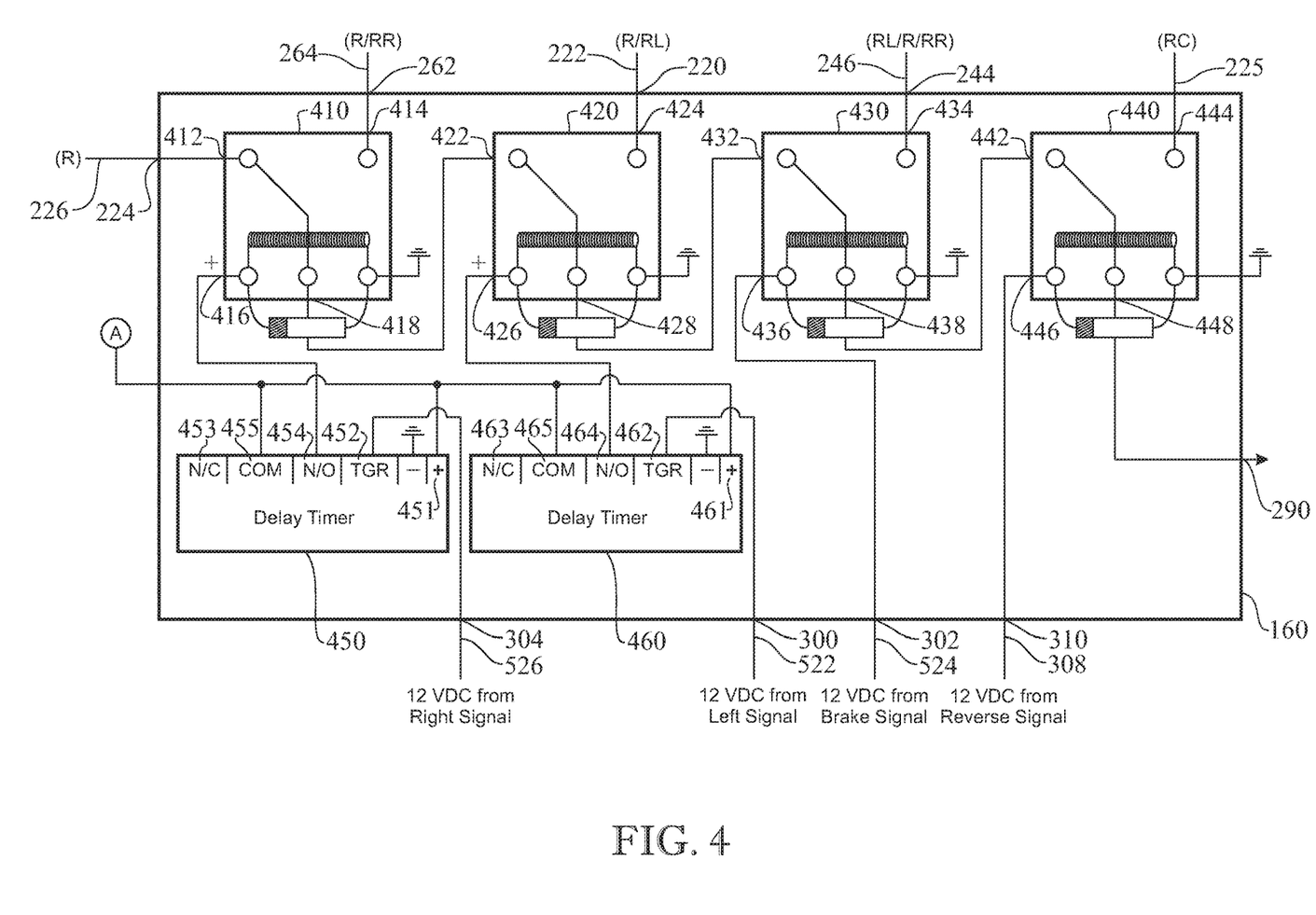
FIG. 4 presents a detailed electrical diagram of the video switch of FIG. 2.

As shown in greater detail in FIG. 4, the video switch 160 is therefore provided with the following images: a video image from the reverse camera (R) 120 via the default input connection 224, a multiplexed "R/RR" video image simultaneously containing images from the rear camera (R) 120 and rear right camera (RR) 122 at input connection 262, a multiplexed "R/RL" video image simultaneously containing images from the rear camera (R) 120 and rear left camera (RL) 124 at input connection 220, a multiplexed "RL/R/RR" video image simultaneously containing images from the rear left camera (RL) 124, rear camera (R) 120 and rear right camera (RR) 122 at input connection 244, and a video image from the reverse camera (RC) 126 at input connection 225.

The video switch 160 combines the video images provided to selectively transmit the desired combination of video images coming from the first, second and third multiplexers 162, 164 and 166, the reverse camera (RC) 126 video image, or the default video image coming from rear camera (R) 120 alone, to the monitor 152 for display in tiled or, in the case of the single rear camera (R) 120 or reverse camera (RC) 126 image, single image format. For this purpose, the video switch 160 has an output connection 290 connected to an input connection 292 of the monitor 152 through a line or connection 294.

With continued reference to FIG. 4, the video switch 160 of the present embodiment comprises a first normally-closed relay 410, a second normally-closed relay 420, a third normally-closed relay 430 and a fourth normally-closed relay 440. Each normally-closed relay 410, 420, 430, 440 comprises a respective normally-closed input 412, 422, 432, 442, a respective normally-open input 414, 424, 434, 444, a respective activation input 416, 426, 436, 446 and a respective output 418, 428, 438, 448. The video switch 160 further includes first and second normally-closed delay timers 450 and 460, which can be ELK-960 timers, for instance and without limitation. Each normally-closed delay timer 450, 460 includes a respective power input (+) 451, 461, a respective trigger input (TGR) 452, 462, a respective normally-closed output (N/C) 453, 463, a respective normally-open output (N/O) 454, 464, and a respective common input (COM) 455, 465. The duration of an output signal at the normally-open outputs 454, 464 of the normally-closed delay timers 450, 460, which is activated by activation of the corresponding trigger input 452, 462, is adjustable (e.g., between 1 and 60 minutes) and is set to a time greater than the time period of the typically-intermittent and periodical, vehicle left and right turning signals (e.g. 2 seconds). Finally, the aforementioned relays and timers include a negative power input (not numbered) which is connected to ground.

With regard to the normally-closed delay timers 450, 460, their power inputs (+) 451, 461 and common inputs (COM) 455, 465 are connected to the control system 114 and receive the operating power or activation signal "A" from the control system 114. The trigger input 452 of the first normally-closed delay timer 450 is connected to a 12 VDC right turn signal 526 of the vehicle 500, this signal typically being intermittent, as known in the art and mentioned heretofore. When the typically-intermittent 12 VDC right turn signal 526 is activated responsively to a driver operating the vehicle turn signal lever (not shown) to indicate a right turn, the trigger input 452 is activated by each pulse of the 12 VDC right turn signal 526 and a 2-second 12 VDC signal is consequently generated at the normally-open output 454 by each pulse, thereby obtaining a continuous or rectified 12 VDC signal at the normally-open output 454. In turn, the trigger input 462 of the second normally-closed delay timer 460 is connected to a typically-intermittent 12 VDC left turn signal 522 of the vehicle 500, such that when the 12 VDC left turn signal 522 is activated responsively to a driver operating the vehicle turn signal lever (not shown) to indicate a left turn, the trigger input 462 is activated by each turn signal 522 and a 2-second 12 VDC signal is consequently generated at the normally-open output 464 by each pulse, thereby obtaining a continuous or rectified 12 VDC signal at the normally-open output 464. Finally, the normally-open outputs 454 and 464 of the normally-closed delay timers 450 and 460, respectively, are connected to the activation inputs 416 and 426 of the first and second normally-closed relays 410 and 420, respectively.

Turning to the normally-closed relays and with continued reference to FIG. 4, the normally-closed input 412 of the first normally-closed relay 410 is connected to the default input connection 224 receiving video image "R" from the rear camera (R) 120; the normally-open input 414, in turn, is connected to the input connection 262 receiving the multiplexed "R/RR" video image; and the activation input 416 is connected to the timed, normally-open output 454 of the first normally-closed delay timer 450. In turn, the normally-closed input 422 of the second normally-closed relay 420 is connected to the output 418 of the first normally-closed relay 410; the normally-open input 424, in turn, is connected to the input connection 220 receiving the multiplexed "R/RL" video image; and the activation input 426 is connected to the timed, normally-open output 464 of the second normally-closed delay timer 460. Similarly, the normally-closed input 432 of the third normally-closed relay 430 is connected to the output 428 of the second normally-closed relay 420; the normally-open input 434, in turn, is connected to the input connection 244 receiving the multiplexed "RL/R/RR" video image; and the activation input 436 is connected to the 12 VDC input connection 302 receiving the 12 VDC brake switch signal 524, which is activated during user operation of the vehicle brake pedal (not shown). Finally, the normally-closed input 442 of the fourth normally-closed relay 440 is connected to the output 438 of the third normally-closed relay 430; the normally-open input 444, in turn, is connected to the input connection 225 receiving the reverse camera "RC" video image; and the activation input 446 is connected to the 12 VDC input connection 310 receiving the 12 VDC reverse light signal 308, which is activated while the vehicle is switched to reverse. Furthermore, as shown, the output 448 of the fourth normally-closed relay 440 is connected to the monitor 152 (FIG. 2) via an output connection 290 of the video switch 160.

Operation of the video switch 160 will now be described with reference to FIGS. 2 and 4. In the absence of any specific activation signals (i.e. all 12 VDC activation signals 526, 522, 524 and 308 deactivated), the video image from the rear camera (R) 120 is conveyed from the first or default input connection 224 of the video switch 160 to the output connection 290 of the video switch 160 via the normally-closed inputs 412, 422, 432, 442 and the outputs 418, 428, 438, 448 of the first through fourth normally-closed relays 410, 420, 430, 440.

When the driver operates the turn signal lever to signal a right turn signal and the intermittent 12 VDC right turn signal 526 is thus activated, a continuous activation signal is received at the activation input 416 of the first normally-closed relay 410, which causes the relay to switch such that the output 418 becomes connected to the normally-open input 414 during the duration of the continuous activation signal. Consequently, the multiplexed "R/RR" video image is provided at the output 418. If none of the activation signals 522, 524 and 308 are activated, the "R/RR" video image is produced at the output connection 290 via the closed, second, third and fourth normally-closed relays 420, 430 and 440 during said duration of the continuous activation signal, after which the first normally-closed delay timer 450 deactivates its normally-open output 454 and the first normally-closed relay 410 consequently switches back to the default position shown in FIG. 2.

Similarly, when the driver operates the turn signal lever to signal a left turn signal and the 12 VDC left turn signal 522 is thus activated, a continuous activation signal is received at the activation input 426 of the second normally-closed relay 420, which causes the relay to switch such that the output 428 becomes connected to the normally-open input 424 during the duration of the continuous activation signal. Consequently, the multiplexed "R/RL" video image is provided at the output 428. If the activation signals 524 and 308 are not activated, the "R/RL" video image is produced at the output connection 290 via the closed, third and fourth normally-closed relays 430 and 440 during said duration of the continuous activation signal, after which the second normally-closed delay timer 460 deactivates its normally-open output 464 and the second normally-closed relay 420 consequently switches back to the default position shown in FIG. 2.

When the driver steps on the vehicle's brakes and the 12 VDC brake switch signal 524 is thus activated, the third normally-closed relay 430 switches so that the output 438 becomes connected to the normally-open input 434. Consequently, as long as the 12 VDC brake switch signal 524 is activated, the multiplexed "RL/R/RR" video image is provided at the output 438. If the 12 VDC reverse light signal 308 is not activated, the "RL/R/RR" video image is thus produced at the output connection 290 via the closed, fourth normally-closed relay 440.

When the driver switches the vehicle 500 to reverse and the 12 VDC reverse light signal 308 is consequently activated, the fourth normally-closed relay 440 switches so that the output 448 becomes connected to the normally-open input 444. Consequently, as long as the 12 VDC reverse light signal 308 is activated, the reverse camera "RC" video image is provided at the output 448 of the fourth normally-closed relay 440, and therefore produced at the output connection 290 of the video switch 160. As can be seen, in the present embodiment, the reverse camera "RC" video image overrides any other activated images in the event that one or more activation signals 526, 522 or 524 are active simultaneously to the 12 VDC reverse light signal 308. Such a feature may be convenient in cases such as that of FIG. 1, in which the reverse camera 126 has a relatively wide angle or area of video coverage 140; in such cases, the present invention prioritizes the reverse camera (RC) 126 image so that the monitor displays a single, wide-angle video image rather than a tiled combination of two or more video images, to better assist the driver while backing up the vehicle 500.

In some embodiments, such as the present embodiment, the monitor 152 may include a power or activation connection 306 for receiving the operating power or activation signal "A" from the control system 114. Similarly, the wireless modem 170 can also include a power or activation connection 322 for receiving the operating power or activation signal "A" from the controls system 114.

Referring now to FIG. 3, the control system 114 generally includes a control and power supply module or control module 330 and a cellular terminal 332, both of which may be permanently powered from the vehicle's 12 VDC battery 528 power through 12 VDC power input connections 336 and 346, respectively.

The control system 114 is configured to supply the aforementioned 12 VDC activation signal "A" to activate (i.e. power) the camera array 110 and the video input/output system 112 in response to the activation of an ignition switch 530 or car alarm system 532 of the vehicle 500. More specifically, as has been described heretofore, this 12 VDC activation signal "A" can power the digital video recorder 150, the monitor 152, the first, second and third multiplexers 162, 164 and 166, the first, second and third splitters 272, 274 and 276, the wireless modem 170, and the video switch 160. The 12 VDC activation signal "A" is carried to the various power or activation connections along a connection or line 344. In some embodiments, the 12 VDC activation signal "A" may have a predetermined duration (e.g., one hour).

The control module 330 can receive power from the ignition switch 530 along a line or connection 368 connected to a 12 VDC ignition input connection 340 of the control module 330. The operation of the car alarm 532 is also connected to the control module 330 along a connection or line 360 at a 12 VDC alarm system input connection 342. Activation of the ignition or alarm of the vehicle 500 activates the control module 338 to generate the 12 VDC activation signal "A" at the 12 VDC output connection 338 for powering the aforementioned devices comprised in the vehicle camera system 100.

The control module 330 can also be activated remotely through the cellular terminal 332. For this purpose, a remote terminal (e.g., a user's smartphone or other electronic device, or a remote security system) may communicate with the cellular terminal 332 over a cellular network (not shown) and transmit a control module activation command to the cellular terminal 332 such as via SMS, data or other communications protocol. Upon receipt of the control module activation command, the cellular terminal 332 may activate a first power output connection 350 and send power to a second power input connection 352 of the control module 330 along a connection or line 354, causing the control module 330 to responsively generate the 12 VDC activation signal "A" at the 12 VDC output connection 338.

The vehicle camera system 100 can further include a remote vehicle-disabling device or remote disabling module 334, the purpose of which is to allow a remote user or system to disable or stop the vehicle 500 or equipment/devices carried by the vehicle 500 in the event of theft or other applicable circumstances. Remote operation of the remote disabling module 334 by the remote user or system is conducted through the cellular terminal 332.

As can be seen in FIG. 3, the remote disabling module 334 can include a normally-closed relay 356 having a normally-closed output 358 which is normally connected to a 12 VDC ignition switch signal 530 and is therefore activated as long as the vehicle 500 engine is running. The normally-closed output 358 is electrically connected to a necessary function device or system 534 of the vehicle 500 (e.g., a fuel pump) and said device or system 534 is normally powered via the normally-closed output 358. In addition, an activation input of the normally-closed relay 356 is connected to a second power output connection 351 of the cellular terminal 332 via a connection or line 362. The remote disabling module 334 can be operated remotely through the cellular terminal 332. For this purpose, a remote terminal (e.g., a user's smartphone or other electronic device, or a remote security system) may communicate with the cellular terminal 332 over a cellular network (not shown) and transmit a remote disabling module operating command to the cellular terminal 332 such as via SMS, data or other communications protocol. Upon receipt of the remote disabling module operating command, the cellular terminal 332 may activate the second power output connection 351. When the second power output connection 351 of the cellular terminal 332 is activated by the aforementioned remote disabling module operating command generated by the remote terminal, power is provided at the activation input of the normally-closed relay 356, switching the normally-closed relay 356 to an open position and causing the normally-closed output 358 to become inactive (i.e. unpowered). In consequence, supply of power to the vehicle device or system 534 (e.g. fuel pump) via the 12 VDC power input 536 and a ground 538 is ceased and the vehicle device or system 534 stops or becomes disabled.

Alternative embodiments are contemplated to those shown in the drawings and descried heretofore. For example, it is contemplated that, with reference to FIGS. 2 and 4, the 12 VDC brake switch signal 524 and the 12 VDC reverse light signal 308 may be interchanged. I.e., the 12 VDC brake switch signal 524 may be connected to the reverse input connection 310 of the video switch 160 and used as the activation signal for selecting the video image from the rear camera (RC) 126 such that said rear camera (RC) video image is provided to the monitor 152 when the driver steps on the vehicle brakes; in turn, the 12 VDC reverse light signal 308 may be connected to 12 VDC input connection 302 of the video switch 160 and used as the activation signal for selecting the combined "RL/R/RR" video image from the rear left camera (RL) 124, rear camera (R) 120 and rear right camera (RR) 122 such that said combined video image is provided to the monitor 152 when the driver switches the vehicle to reverse.

In some embodiments, it is contemplated that the cellular terminal 332 may additionally include a geolocation feature or global positioning system "GPS" allowing the owner or security personal to keep track of the vehicle's location.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A video camera system for capturing and processing images around a vehicle, the vehicle camera system comprising:
   a camera array including a rear left video camera configured to capture a first video image showing an area at the left and rear of a vehicle, a rear right video camera configured to capture a second video image showing an area at the right and rear of a vehicle, and a rear video camera configured to capture a third video image showing an area at the rear of a vehicle; and
   a video input and output system for receiving the video images generated by the camera array, wherein the video input and output system is connected to the camera array and comprises a first normally-closed relay and a second normally-closed relay; wherein
   the first normally-closed relay is configured to switch from a closed position to an open position responsively to activation of a left turn signal of the vehicle, the first normally-closed relay comprising:
      a normally-closed input,
      a normally-open input configured to receive a combination of the first and third video images, and
      an output, which is connected to the normally-closed input of the first normally-closed relay when the first normally-closed relay is in the closed position, and which is connected to the normally-open input of the first normally-closed relay and provides the combination of the first and third video images when the first normally-closed relay is in the open position; wherein
   the second normally-closed relay is configured to switch from a closed position to an open position responsively to activation of a tight turn signal of the vehicle, the second normally-closed relay comprising:
      a normally-closed input,
      a normally-open input configured to receive a combination of the second and third video images, and
      an output, which is connected to the normal-closed input of the second normally-closed relay when the second normally-closed relay is in the closed position, and which is connected to the normally-open input of the second normally-closed relay and provides the combination of the second and third video images when the second normally-closed relay is in the open position; and wherein
   the output of one of the first and second normally-closed relays is in electrical communication with the normally-closed input of the other of the first and second normally-closed relays.

2. The video camera system of claim 1, wherein the video input and output system further comprises:
   a third normally-closed relay, configured to switch from a closed position to an open position responsively to activation of the vehicle brakes, the third normally-closed relay comprising:
      a normally-closed input,
      a normally-open input configured to receive a combination of the first, second and third video images, and
      an output which is connected to the normally-closed input of the third normally-closed relay when the third normally-closed relay is in the closed position, and which is connected to the normally-open input of the third normally-closed relay and provides the combination of the first, second and third video images when the third normally-closed relay is in the open position; and wherein
   the output of the other of the first and second normally-closed relays is in electrical communication with the normally-closed input of the third normally-closed relay.

3. The video camera system of claim 2, wherein the camera array further comprises a reverse video camera configured to capture a fourth video image showing an area at the rear of the vehicle, and wherein the video input and output system further comprises:
   a fourth normally-closed relay, configured to switch from a closed position to an open position responsively to switching of the vehicle to reverse, the fourth normally-closed relay comprising:
      a normally-closed input,
      a normally-open input configured to receive the fourth video image, and
      an output, which is connected to the normally-closed input of the fourth normally-closed relay when the fourth normally-closed relay is in the closed position, and which is connected to the normally-open input of the fourth normally-closed relay and provides the fourth video image when the fourth normally-closed relay is in the open position; and wherein
   the output of the third normally-closed relay is in electrical communication with the normally-closed input of the fourth normally-closed relay.

4. The video camera system of claim 1, wherein the area at the left and rear of the vehicle overlaps with the area at the rear of the vehicle.

5. The video camera system of claim 1, wherein the area at the right and rear of the vehicle overlaps with the area at the rear of the vehicle.

6. The video camera system of claim 1, further comprising a digital video recorder configured to record the first, second and third video images.

7. The video camera system of claim 1, further comprising a monitor configured to view a video image delivered by the video input and output system.

8. The video camera system of claim 1, wherein the camera array further comprises at least one frontward-oriented camera configured to capture at least one front video image of a front of the vehicle.

9. The video camera system of claim 8, further comprising a monitor configured to view the first, second and third video images and the at least one front video image.

10. The video camera system of claim 8, further comprising a digital video recorder configured to record the first, second and third video images and the at least one front video image.

11. The video camera system of claim 8, wherein the at least one frontward-oriented camera comprises a front left video camera configured to capture a fifth video image showing an area at the left and front of a vehicle, a front right video camera configured to capture a sixth video image showing an area at the right and front of a vehicle, and a front video camera configured to capture a seventh video image showing an area at the front of a vehicle.

12. The video camera system of claim 11, wherein the area at the left and front of the vehicle overlaps with the area at the front of the vehicle.

13. The video camera system of claim 11, wherein the area at the right and front of the vehicle overlaps with the area at the front of the vehicle.

14. The video camera system of claim 1, wherein the vehicle camera system is configured to be powered on by at least one of a vehicle ignition activation signal responsive to vehicle ignition activation, a vehicle alarm activation signal responsive to a vehicle alarm activation, and a remote command activation signal generated by a computer network terminal comprised in the video camera system, the remote command activation signal generated responsively to the computer network terminal receiving an activation command from a remote terminal over a computer network.

15. The video camera system of claim 1, wherein the first normally-closed relay comprises an activation input, the activation of which is configured to switch the first normally-closed relay from the closed position to the open position, and further wherein the video input and output system further comprises a first delay timer configured to rectify the left turn signal of the vehicle and thereby generate a rectified left turn signal which is provided to the activation input of the first normally-closed relay.

16. The video camera system of claim 1, wherein the second normally-closed relay comprises an activation input, the activation of which is configured to switch the second normally-closed relay from the closed position to the open position, and further wherein the video input and output system further comprises a second delay timer configured to rectify the right turn signal of the vehicle and thereby generate a rectified right turn signal which is provided to the activation input of the first normally-closed relay.

17. The video camera system of claim 1, wherein the video input and output system further comprises:
   a third normally-closed relay, configured to switch from a closed position to an open position responsively to switching of the vehicle to reverse, the third normally-closed relay comprising:
      a normally-closed input,
      a normally-open input configured to receive a combination of the first, second and third video images, and
      an output, which is connected to the normally-closed input of the third normally-closed relay when the third normally-closed relay is in the closed position, and which is connected to the normally-open input of the third normally-closed relay and provides the combination of the first, second and third video images when the third normally-closed relay is in the open position; and wherein
   the output of the other of the first and second normally-closed relays is in electrical communication with the normally-closed input of the third normally-closed relay.

18. The video camera system of claim 17, wherein the camera array further comprises a reverse video camera configured to capture a fourth video image showing an area at the rear of the vehicle, and wherein the video input and output system further comprises:
   a fourth normally-closed relay, configured to switch from a closed position to an open position responsively to activation of the vehicle brakes, the fourth normally-closed relay comprising:
      a normally-closed input,
      a normally-open input configured to receive the fourth video image, and
      an output, which is connected to the normally-closed input of the fourth normally-closed relay when the fourth normally-closed relay is in the closed position, and which is connected to the normally-open input of the fourth normally-closed relay and provides the fourth video image when the fourth normally-closed relay is in the open position; and wherein
   the output of the third normally-closed relay is in electrical communication with the normally-closed input of the fourth normally-closed relay.

* * * * *